United States Patent [19]
Akiyama et al.

[11] Patent Number: 5,339,158
[45] Date of Patent: Aug. 16, 1994

[54] SEPARATION/SYNTHESIS MIRROR DEVICE IN LIQUID FILLED HOUSING WITH INDEX MATCHING

[75] Inventors: Masayuki Akiyama; Manabu Akagi, both of Tokyo, Japan

[73] Assignee: Pioneer Electronic Corporation, Tokyo, Japan

[21] Appl. No.: 21,344

[22] Filed: Feb. 23, 1993

[30] Foreign Application Priority Data

Feb. 28, 1992 [JP] Japan .................. 4-043741

[51] Int. Cl.$^5$ .................................. H04N 9/31
[52] U.S. Cl. .................... 348/757; 348/780
[58] Field of Search ............ 359/634, 665, 832; 358/60, 55; H04N 9/31

[56] References Cited
U.S. PATENT DOCUMENTS

| | | | |
|---|---|---|---|
| 4,151,554 | 4/1979 | Tucker | 358/60 |
| 4,687,301 | 8/1987 | Ledebuhr | 359/634 |
| 4,764,806 | 8/1988 | Altman | 358/60 |
| 5,066,114 | 11/1991 | Hodges | 359/665 |
| 5,168,351 | 12/1992 | Bradley et al. | 358/60 |

FOREIGN PATENT DOCUMENTS 1-214801  8/1989  Japan .................. H04N 9/31

*Primary Examiner*—Mark R. Powell
*Attorney, Agent, or Firm*—Kane, Dalsimer, Sullivan, Kurucz, Levy, Eisele and Richard

[57] ABSTRACT

A three color separation/synthesis mirror device includes a housing, four dichroic mirrors which are arranged in the housing and cross with each other at right angles to form an X-shape, and a liquid filled in the housing so as to submerge the respective dichroic mirrors. A refractive index of the liquid is higher than that of the dichroic mirrors. A correction prism for making an emergent light in parallel to an incidental light may be located in a corner on the incidental side of the X-shaped dichroic mirrors. Double image blurs due to the entrance rays can be obviated. Also, such a characteristic that the refractive index of the liquid is lowered when the liquid is heated, is utilized so that the refractive index of the liquid becomes close to the refractive index of the glass.

18 Claims, 14 Drawing Sheets

F I G. 10
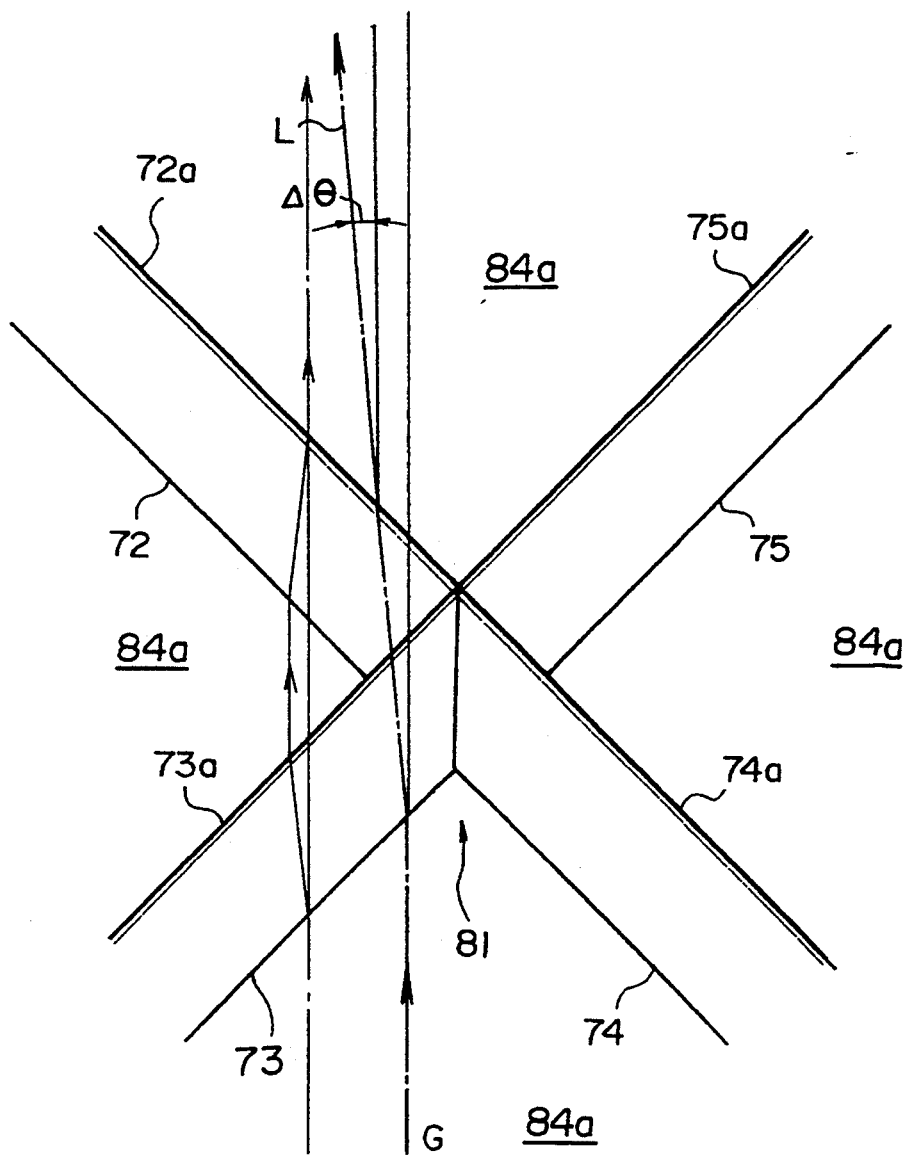

SEPARATION/SYNTHESIS MIRROR DEVICE IN LIQUID FILLED HOUSING WITH INDEX MATCHING

BACKGROUND OF THE INVENTION

1. Field of the Invention

The present invention relates to an improvement in a dichroic mirror device for separating/synthesizing a red light (R), a green light (G) and a blue light (B), which device is used for a projector such as a liquid crystal projector. The present invention also relates to a projection display apparatus using such a dichroic mirror device.

2. Description of the Related Art

Liquid crystal projectors, CRT (Cathode Ray Tube) projectors and CCD (Charged Coupled Device) cameras are accommodated in rear projection televisions, front projection televisions or television cameras. Projectors employing liquid crystal panels or CRTs for the above colored lights R, G or B, require a mechanism to separate or synthesize lights. There is a device for light separation/synthesis using a glass prism. However, the glass prism is actually used only for 1 to 2 inch liquid crystal panels. If employing a glass prism for a larger liquid crystal panel or a CRT, the glass prism has to be very large in size with an increased cost. Furthermore, there may arise the problem of retardation (irregular phase difference), when a large glass prism is used.

There is another device for light separation/synthesis, which uses three dichroic mirrors instead of a glass prism. FIG. 14 shows such a cross-type three color separation/synthesis mirror device 4. The device comprises a dichroic mirror 1 and two otherdichroic mirrors 2 and 3 holding the mirror 1 therebetween, which forms an X-shape. A blue light B is emitted from a CRT 5, a green light G from a CRT 6 and a red light R from a CRT 7, respectively. Those three colored lights are synthesized by the separation/synthesis mirror device 4, pass through a lens 8 and are projected to the screen (not shown in FIG. 14) to form an image thereon.

However, a light passing through the joint portion 9 goes along a different path from that of a light passing through other portions of the device, which adversely affects the image quality. For example, a double image appears around the center of the screen, the image gets blurred or it lacks clearness, resulting in decrease in number of scanning lines.

The other problem is an out-of-focus image and a decline in image contrast caused by an increase in the astigmatism. The astigmatism increases because the dichroic mirrors 1 to 3 are placed obliquely to the CRTs 5 to 7.

SUMMARY OF THE INVENTION

In view of the above-noted defects, an object of the present invention is to provide a three color separation/synthesis mirror device as well as a projection display apparatus using such a mirror device, which improves the image quality.

According to the present invention, there is provided a three color separation/synthesis mirror device which comprises a housing, four dichroic mirrors which are arranged in the housing and cross with each other at right angles to form an X-shape, and a liquid filled in the housing so as to submerge the respective dichroic mirrors, wherein a refractive index of the liquid is higher than that of the dichroic mirrors.

It is preferable that a correction prism for making an emergent light in parallel to an incidental light is located in a corner on the incidental side of the X-shaped dichroic mirrors.

According to the invention, since the liquid sealed in the housing is selected from a substance which has a higher refractive index than that of the glass etc. forming the dichroic mirrors, double image blurs due to the entrance rays can be obviated. Also, such a characteristic that the refractive index of the liquid is lowered when the liquid is heated, is utilized so that the refractive index of the liquid becomes close to the refractive index of the glass. Accordingly, it is possible to eliminate the blur by keeping the optical path of the entrance rays in parallel without substantial change at the joint portion of the dichroic mirrors. Also, by providing the correction prism such that the incidental light refracted through the correction prism passes through the dichroic mirrors, the light emergent from the dichroic mirrors can be kept in parallel to the incidental light.

According to the present invention, the above mentioned object can be also achieved by a projection display apparatus, including: a light source for generating a light containing three primary color lights; a component color separator for separating the light from the light source into the three primary color lights; three light valves in which optical images are formed for respectively modulating the three primary color lights from the component color separator; drivers for driving the three light valves according to a video signal to form the optical images; a light combinet for combining modulated lights from the three light valves into a composite luminous flux; and a project lens for projecting the composite luminous flux onto a screen to produce thereon an enlargement of the optical images. Here, the light combiner includes: a housing; four dichroic mirrors which are arranged in the housing and cross with each other at right angles to form an X-shape; and a liquid filled in the housing so as to submerge the respective dichroic mirrors, wherein a refractive index of the liquid is higher than that of the dichroic mirrors.

Accordingly, the image quality displayed on the screen can be improved by virtue of the light combinet, according to the projection display apparatus of the present invention. The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 10 is an enlarged plan view showing a joint portion of dichroic mirror without a correction prism;

DESCRIPTION OF THE PREFERRED EMBODIMENTS

The three color separation/synthesis mirror device according to the present invention will now be explained with reference to FIGS. 1 to 13.

Figure 1:
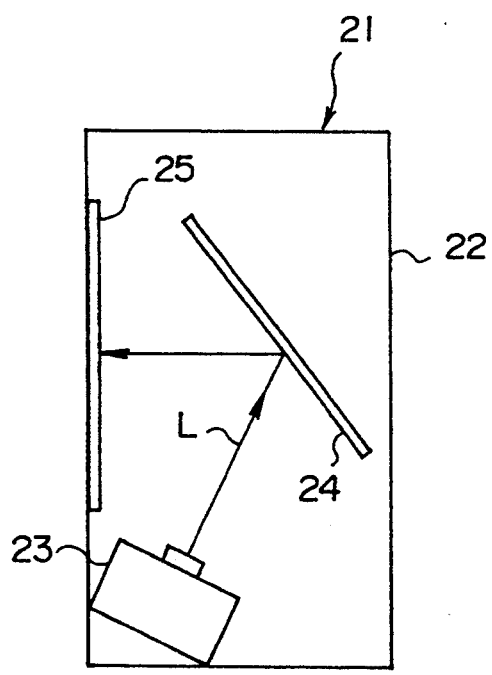
FIG. 1 is a schematic side elevational view showing a rear projection television set for illustrating one embodiment of the present invention.
Figure 2:
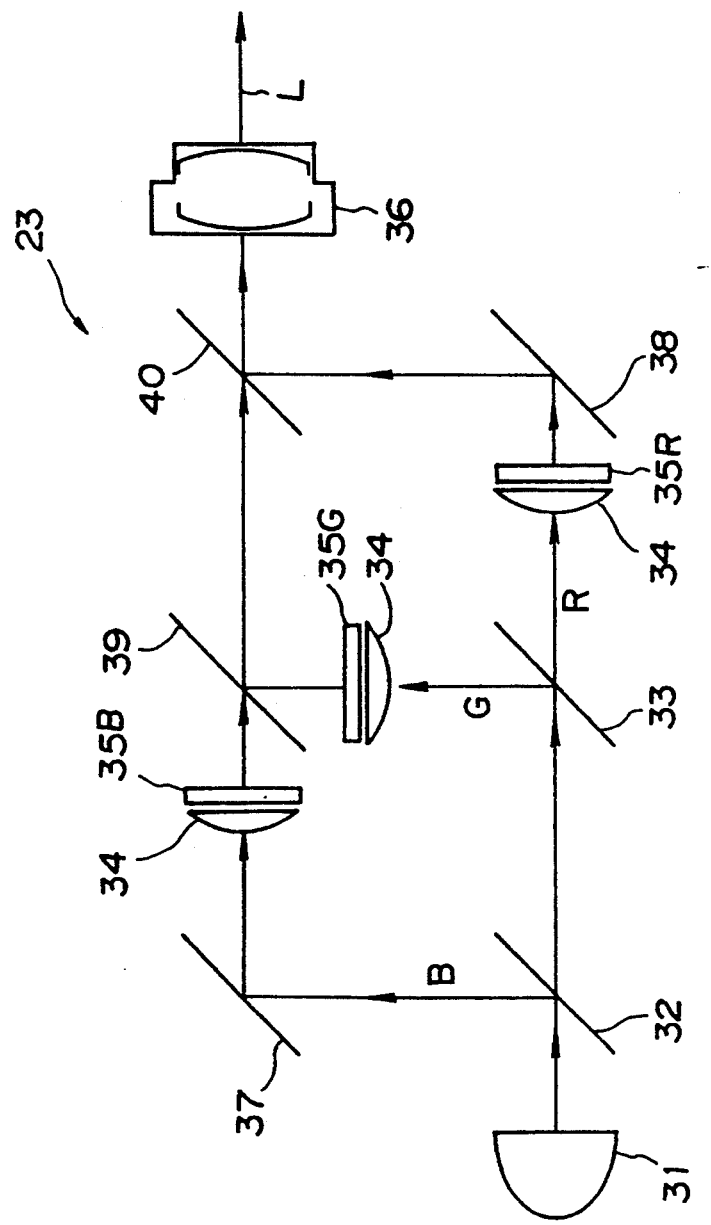
FIG. 2 is an illustration of a principle of a liquid crystal projector.
Figure 3:
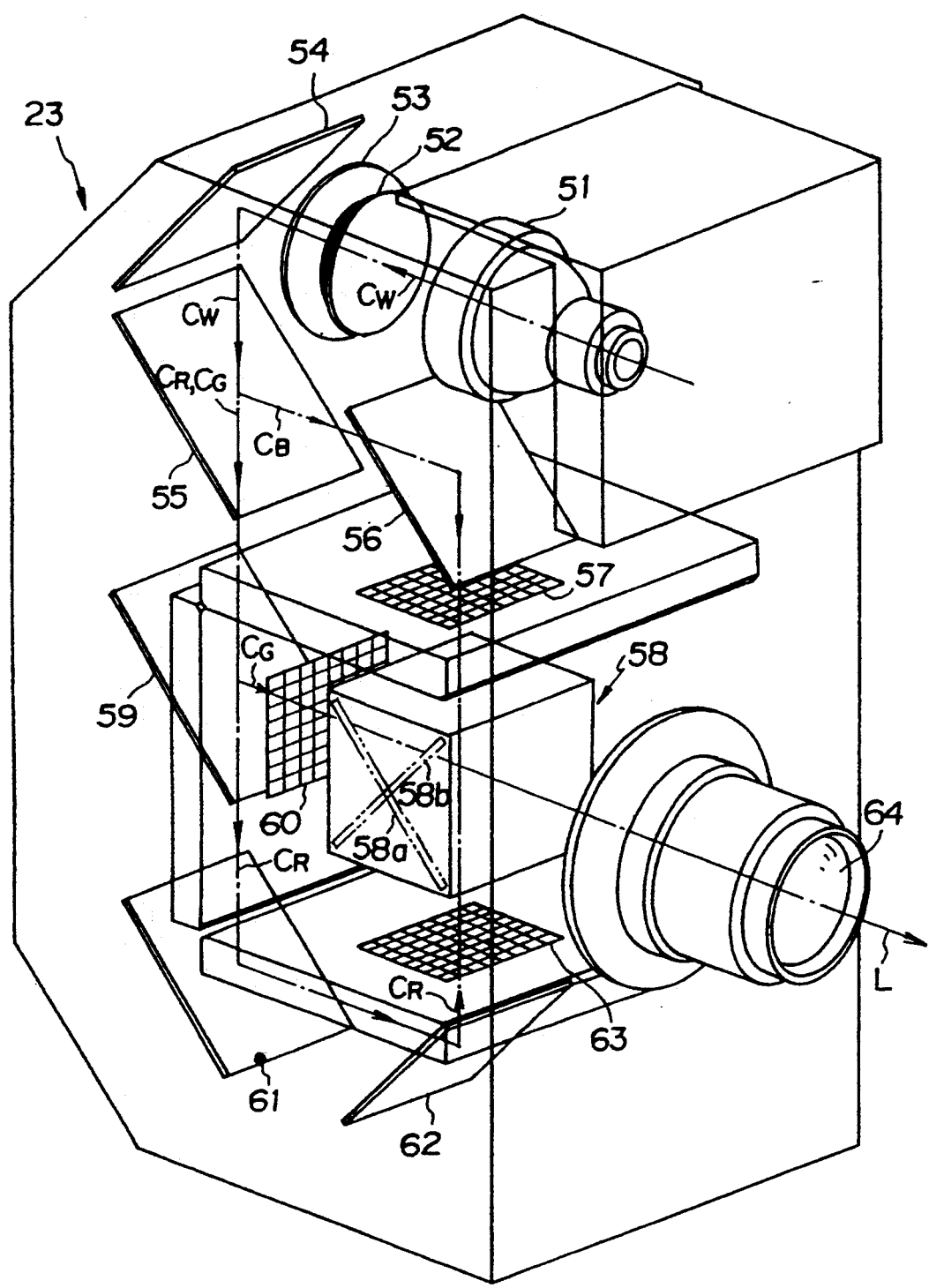
FIG. 3 is a view showing an internal structure of the liquid crystal projector.

FIGS. 1 to 3 show a rear project-ion television 21 equipped with a liquid crystal projector 2S. The liquid crystal projector 23 has separate liquid crystals for a red light (R), a green light (G) and a blue light (B), together with a single projection lens to project a colored light (L).

As shown in FIG. 1, the liquid crystal projector 23 is accommodated in a housing 22 of the rear projection television 21 and emits a colored light (L). The colored light (L) emitted from the projector 23 is reflected by a total reflection mirror 24 placed obliquely in the housing 22, and is projected to the rear surface of the screen 25 fitted on the front surface of the housing 22. The screen 25 consists of a Fresnel lens and a lenticular lens. The projected light, then, forms a color image on the front surface of the screen FIGS. 2 and 3 illustrate the structure of the liquid crystal projector 23.

FIG. 2 shows the principle of the projector 23. As shown in FIG. 2, a light collecting reflector 31 collects light to emit a white light which is separated into three colored lights of a red light (R), a green light (G) and a blue light (B) through dichroic mirrors 32 and 33. The R, G and B lights, then, pass through condenser lenses 34 to go into liquid crystal panels 35R, 35G and 35B respectively. The transmittance of the liquid crystal panels 35R, 35G and 35B changes according to image signals to selectively transmit and cut off the R, G and B lights. The transmitted lights are projected by a projection lens 36, as a colored light (n). In FIG. 2, the reference numerals 37 and 38 represent total reflection mirrors, and the reference numerals 39 and 40 represent dichroic mirrors.

FIG. 3 illustrates a concrete internal construction of the liquid crystal projector 23. As shown in FIG. 3, a condensing reflector 51 with a tungsten-halogen lamp, a metal-halide lamp or the like as its light Source projects a white light $C_w$. The white light $C_w$ goes through filters 52 and 53, which eliminate ultraviolet and infrared rays, and is reflected by a total reflection mirror 54. Of the white light $C_w$, a red light $C_R$ and a green light $C_G$ pass through a dichroic mirror 55, while a blue light $C_B$ is reflected thereby. The blue light $C_B$, then, is reflected by a total reflection mirror 56 and passes through a liquid crystal panel 57, as the transmission factor of the liquid crystal panel 57 is altered. The blue light $C_B$ now enters the three color separation/synthesis mirror device 58. A dichroic mirror 58a of the three color separation/synthesis mirror device 58 only reflects a blue light $C_B$ and transmits the other two colored lights $C_R$ and $C_G$, whereas another dichroic mirror 58b only reflects a red light $C_R$ and transmits the other two colored lights $C_G$ and $C_B$. The blue light $C_B$, therefore, enters a projection lens 64 after being reflected by the dichroic mirror 58a.

Between the red light $C_R$ and green light $C_G$ transmitted by the dichroic mirror 55. The green light $C_G$ is reflected by a dichroic mirror 59 and the red light $C_R$ is transmitted. The green light $C_G$, then, goes through a liquid crystal panel 60, as the transmission factor of the liquid crystal panel 60 is altered, the green light $C_G$ passes straight through the three color separation/synthesis mirror device 58 to the projection lens 64. The red light $C_R$, transmitted by the dichroic mirror 59, is reflected by total reflection mirrors 61 and 62, and passes through a liquid crystal panel 63, as the transmittance of the panel 63 is altered. The red light $C_R$ now enters the three color separation/synthesis mirror device 58, in which the red light is reflected by he dichroic mirror 58b, and reaches the projection lens 64. In this way, the projection lens 64 projects a light (L) including the three colored lights (R, G, B).

An embodiment of the invention will now be described with reference to FIGS. 4 to 9.

Figure 4:
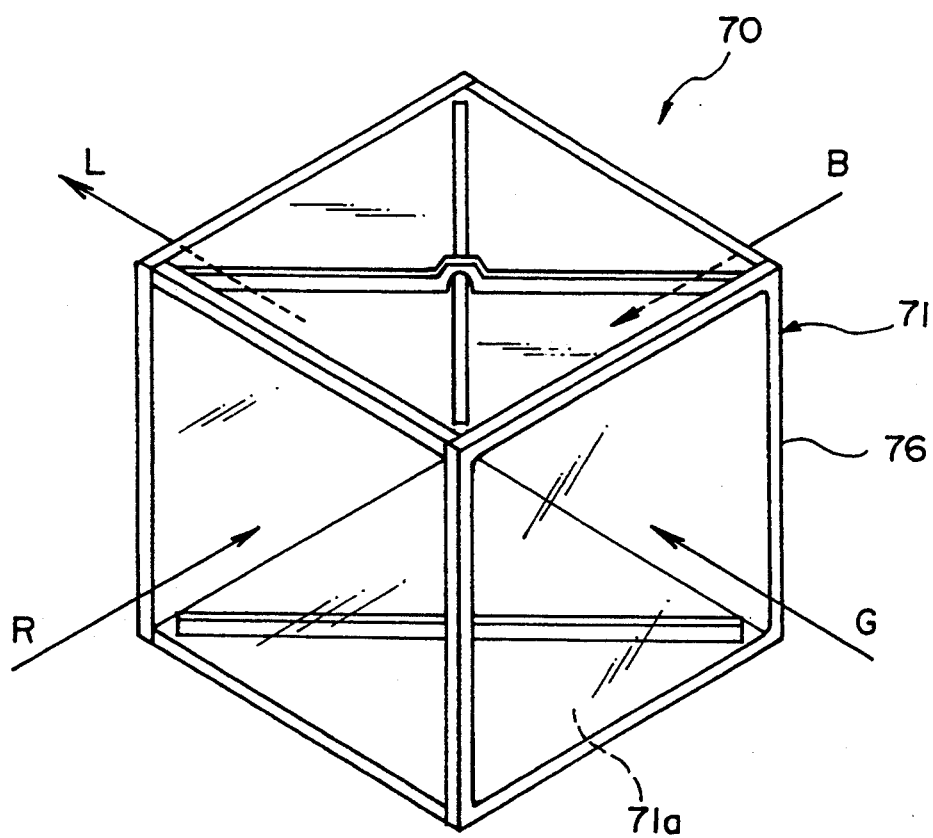
FIG. 4 is a perspective view showing a structure of a mirror portion of a three color separation/synthesis mirror device according to the embodiment of the invention.
Figure 5:
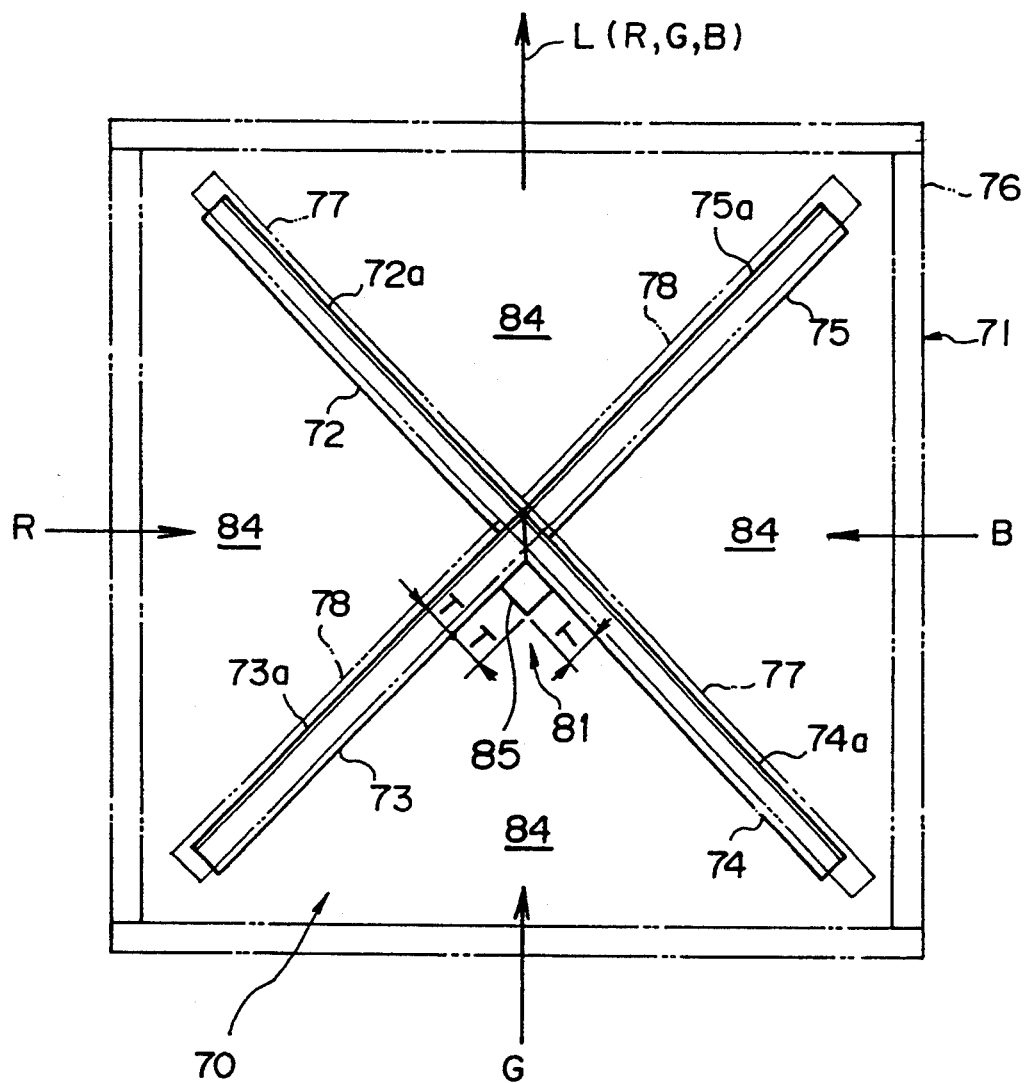
FIG. 5 is a plan view showing the structure shown in FIG. 4.
Figure 6:
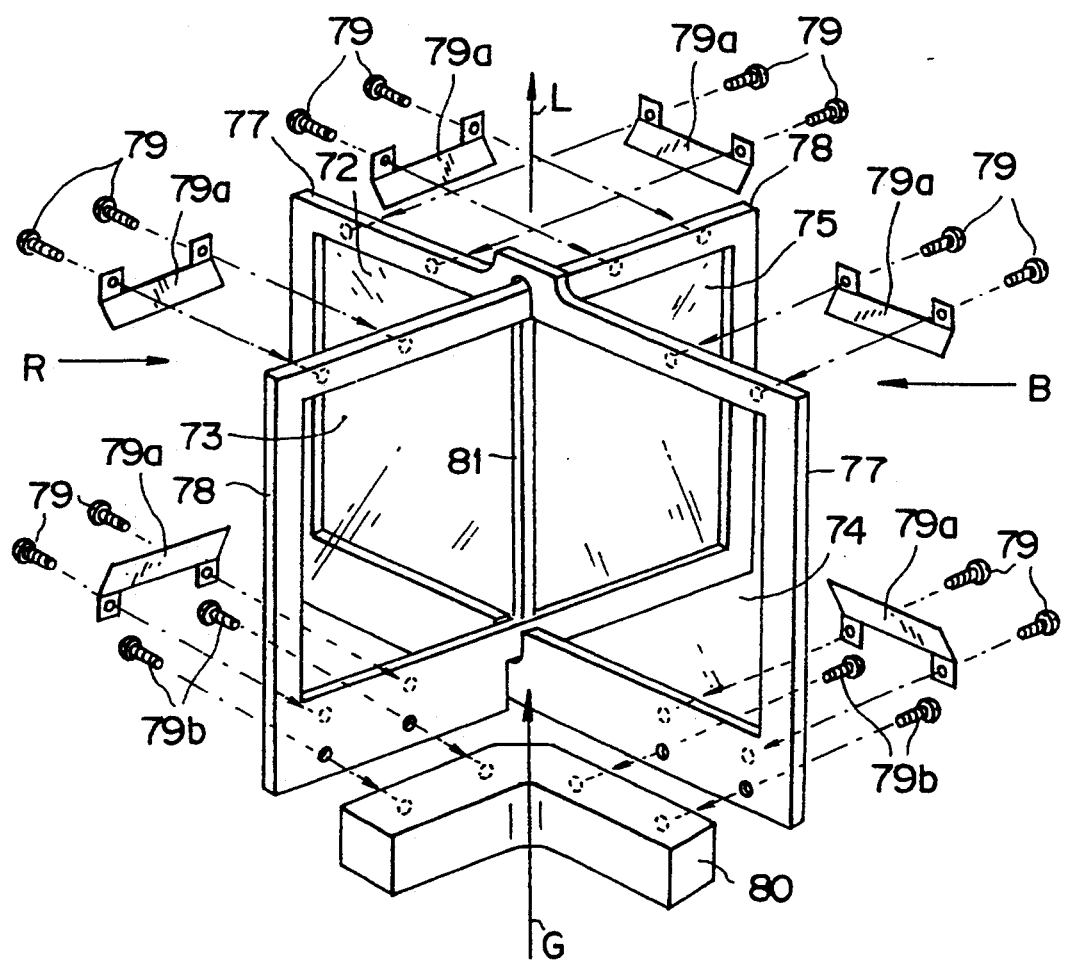
FIG. 6 is a perspective view showing the structure shown in FIG. 4 from which a frame has been removed.

FIGS. 4 to 6 show the construction of the three color separation/synthesis mirror device (corresponding to the three color separation/synthesis mirror device 58 shown in FIG. 3) in relation to the present embodiment. As shown in FIGS. 4 to 6, four dichroic mirrors 72 to 75 are installed along the diagonal lines of a parallelepiped or cubic housing 71 inside thereof. The dichroic mirrors 72 to 75 cross each other at right angles forming an X-shape. The housing 71 is made of lass plates of a high transparency except for the bottom plate 71a. The glass plates are supported by a framework 76 to which the bottom plate 71a is fixed, so that the housing 71 forms a sealed structure.

As shown in FIG. 5, dichroic mirror surfaces 72a, 73a, 74a and 75a, are provided on one surface of each dichroic mirror 72, respectively. A pair of dichroic mirrors 72 and 74, placed in alignment, are held together in a first rectangular guide frame 77 via holding springs 79a fastened by a plurality of screws 79. These two dichroic mirrors 72 and 74 abut against each other at the center portion of the guide frame 77. The other pair of dichroic mirrors 73 and 75 in alignment are likewise held in a second guide frame 78 via mirror holding springs 79a by a plurality of screws 79, and two dichroic mirrors abut against each other at the center portion of the guide frame 78. The second guide frame 78 is cross-inserted into the first guide frames 77 at a right angle. Each lower portion of the guide frames 77 and 78 is fastened to a supporting base 80 by a plurality of screws 79b. The supporting base 80 is fitted to the bottom plate 71a of the housing 71. Since the respective dichroic mirrors 72 to 75 are held by the first and second guide frames 77 and 78, it is possible to perform exact positional adjustment for the respective mirrors 72 to 75.

As shown in FIG. 5, the colored lights (R, G, B) enter into the three color separation/synthesis device 70 and are synthesized into the colored light L to emit from the device. A correction prism 86 for making the emergent light in parallel to the incidental light is located in a corner portion 81 on the incidental side of the dichroic mirrors 73 and 74 to which the green light G is introduced. The correction prism 86 extends longitudinally in a direction perpendicular to the paper surface of FIG. 5 and is in the form of a rectangular post having a regular square cross-section with sides equal to a thickness T of the dichroic mirrors. The correction prism 86 is made of the same material as that of the dichroic mirrors 73 and 74 with the same refractive index. The correction prism 86 is fixed to the corner square portion of the dichroic mirrors 73 and 74 by a fastening means such as adhesives or retainer springs (not shown).

A liquid 84 such as benzyl alcohol is filled in the housing 71 in a liquid-tight manner. The respective dichroic mirrors 72 to 75 are submerged into the liquid. The reason why the liquid 84 is filled in the housing 71 is that the optical distance is shortened to make clear the image, the dichroic mirrors are cooled down and the change of each mirror in refractive index due to the difference in temperature is absorbed. The respective materials are selected to meet the following relationship:

$$n_g \leq n_l$$

where $n_g$ is the refractive index of the dichroic mirrors 72 to 75 and $n_l$ is the refractive index of the liquid 84. For instance, it is preferable that the dichroic mirrors 72 to 75 be formed of glass material having the refractive index $n_g = 1.519$ and the liquid 84 be benzyl alcohol having the refractive index $n_l = 1.535$.

Figure 11:
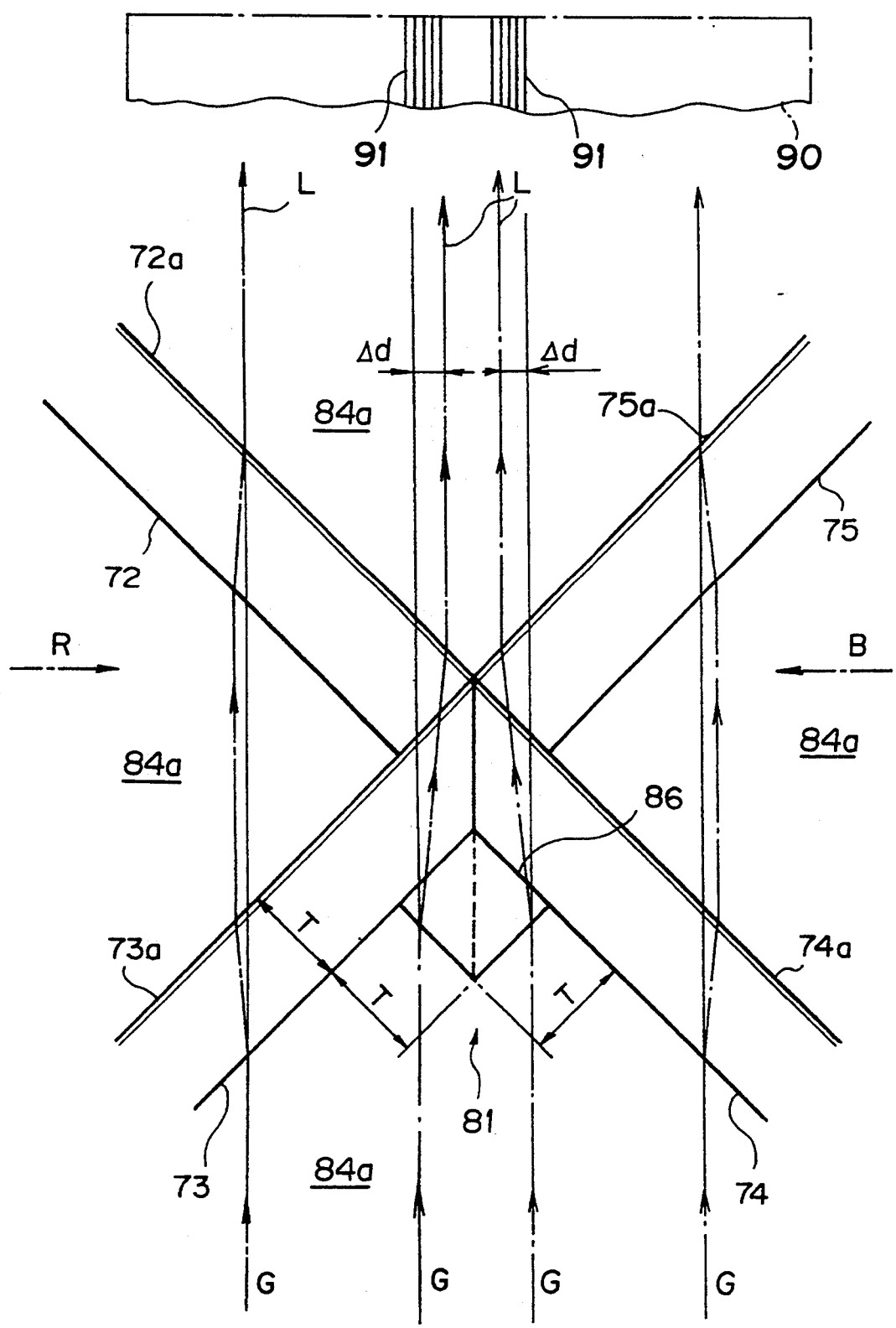
FIG. 11 is an enlarged plan view showing the case that a correction prism is added to the structure shown in FIG. 10.

FIGS. 10 and 11 shows a comparison example, in which mixed liquid composed of glycerine and ethylene glycol (refractive index $n_l = 1.424$) is used as the liquid 84 to is filled in the housing 71. The refractive index $n_l$ is smaller than the refractive index of glass $n_g = 1.519$. The direction of the emergent light L is changed obliquely at an angle $\Delta\theta$ (for example, 8° to 10°) relative to the colored light G (or B or R) to be introduced into the corner portion 81 to thereby form a ghost image at the central portion of the image. In other words, for instance, the colored light which has been introduced into the mirror 73 is advanced slightly outwardly due to the difference in refractive index, and when the light is emitted from the mirror 72, the light could not been emitted in parallel to the original incidental light again due to the difference in angle of the mirror 73 so that the light would be emitted at an angle of $\Delta\theta$. This will be remarkable to form a considerably difference when the incidental angle with respect to the mirrors 73 and 74 is offset from 45°, resulting in generation of stray light.

FIG. 11 shows the case where the correction prism 86 which is the same as that shown in FIG. 5 is provided in the incidental corner portion 81. In this case, since the direction of the emergent light n is changed in the opposite side by $\Delta\theta$ in comparison with the comparison example case of FIG. 10, due to the existence of the correction prism 86 located in the corner portion 81 on the incidental side, the emergent light L which has passed through the correction prism 86 is offset laterally (in the right and left central direction) by an offset distance $\Delta d$ relative to the incidental light G to form parallel lights. Accordingly, the emergent light L does not include any oblique lights. Thus, it is possible to correct the angle of the lights but it is impossible to correct the position of the lights. Therefore, in the case where the emergent light L is projected onto the screen 90, it is impossible to avoid a dark portion 91 on the screen 90.

Figure 7:
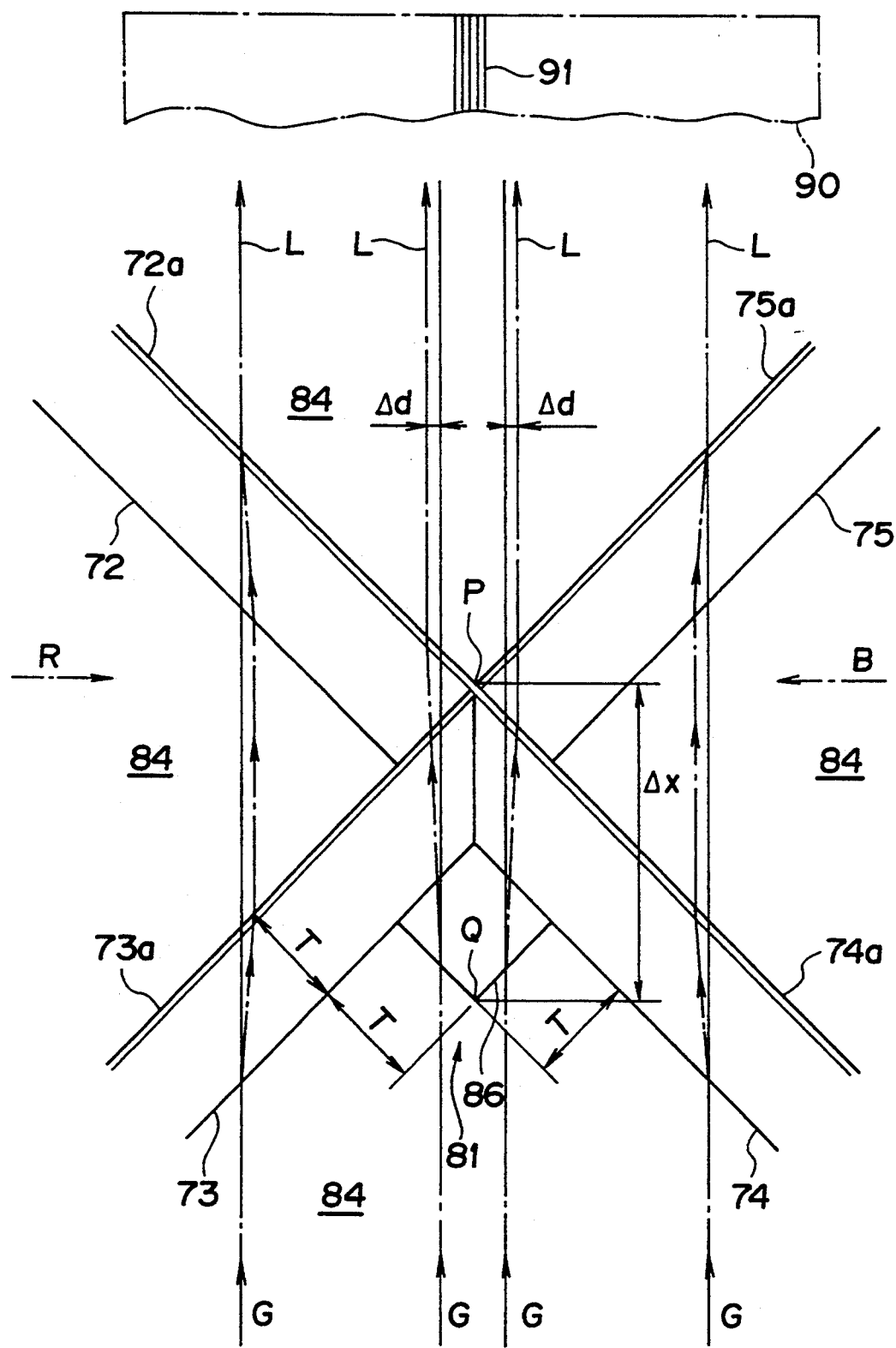
FIG. 7 is an enlarged plan view showing a Joint portion of the dichroic mirror according to the invention.
Figure 12:
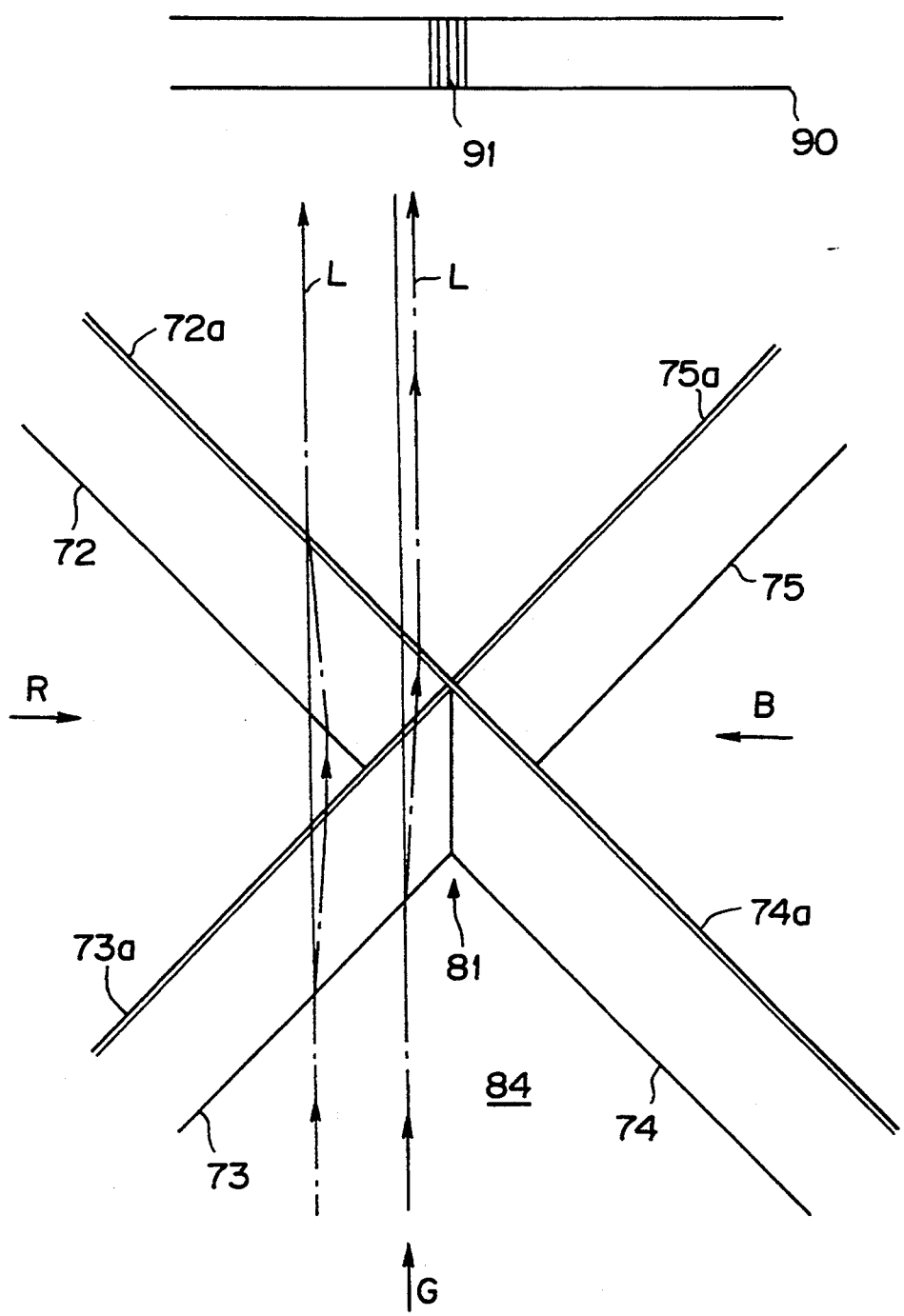
FIG. 12 is an enlarged plan view showing a joint portion of the dichroic mirror of another embodiment according to the invention.

In contrast, in the three color separation/synthesis device of the present embodiment, the refractive index of the liquid is higher than that of the dichroic mirrors and the refractive indecies of the glass material forming the dichroic mirrors and the liquid are close to each other. Thus, since the refractive indecies of the glass and the liquid are close to each other, as shown in FIG. 7, the offset distance $\Delta d$ of the emergent light L relative to the incidental light G is significantly small in comparison with the comparison examples of FIGS. 10 and 11. Also, due to the fact that the refractive index of the liquid is higher than that of the glass, the number of scanning lines is one in the dark portion 91 in comparison with the comparison example case where the number is two. Thus, the adverse affect on the image can be reduced. Incidentally, in this embodiment, there is shown the case where the correction prism 86 is provided but it is possible to dispense with the correction prism 86. Namely, even in the case that the correction prism 86 is not provided in the construction of FIG. 7, the emergent light L through the cross section of the mirrors becomes approximately parallel or slightly inwardly inclined according to the present embodiment, so that only one band of dark portion 91 is formed on the screen 90 as shown in FIG. 12, (while two bands of dark portion 91 are formed in the comparison example of FIGS. 10 and 11), and thus the same advantageous result as in the above mentioned case of FIG. 7, can be obtained in this case.

The examples in which the correction prism 86 is used and the various combinations among the liquid 84a, the glass having the thickness of 0.7 mm and the offset distance $\Delta d$ are used, are shown in Table 1 below.

TABLE 1

| | Kind of liquid | $N_l$ of liquid | Kind of glass | $n_g$ of glass | Offset distance of $\Delta d$ (mm) |
|---|---|---|---|---|---|
| Comparison example | mixture of ethylene glycol and glycerine | 1.442 | BK7 | 1.519 | 0.0934 |
| the present embodiment | benzyl alcohol | 1.535 | BK7 | 1.519 | 0.021 |
| | toluene | 1.4941 | PMMA | 1.492 | 0.0028 |
| | benzene | 1.4949 | PMMA | 1.492 | 0.0039 |
| | mixture of ethylene glycol and glycerine | 1.442 | FK | 1.435 | 0.0097 |

The explanation will be made as to the offset distance $\Delta d$. The angle difference between the incidental light G and the emergent light L of the cross mirror portion is corrected so that the relative angle $\Delta\theta$ is zero. However, the positional relationship therebetween is not in the relationship on the straight line and the light is emerged to offset laterally due to the difference in refractive index between the glass and liquid. The amount of this difference is referred to as offset distance Δd (see FIG. 7). The offset distance Δd is given by the following expression (1):

$$\Delta d = \frac{\Delta x \times \tan\left\{\sin^{-1}\left(\frac{n_L}{n_g}\sin 45°\right) - 45°\right\}}{1 - \tan\left\{\sin^{-1}\left(\frac{n_L}{n_g}\sin 45°\right) - 45°\right\}} \quad (1)$$

where Δx is the distance between the lower apex Q of the correction prism and the intersection P between the dichroic mirrors 72 and 75 (see FIG. 7).

Figure 8:
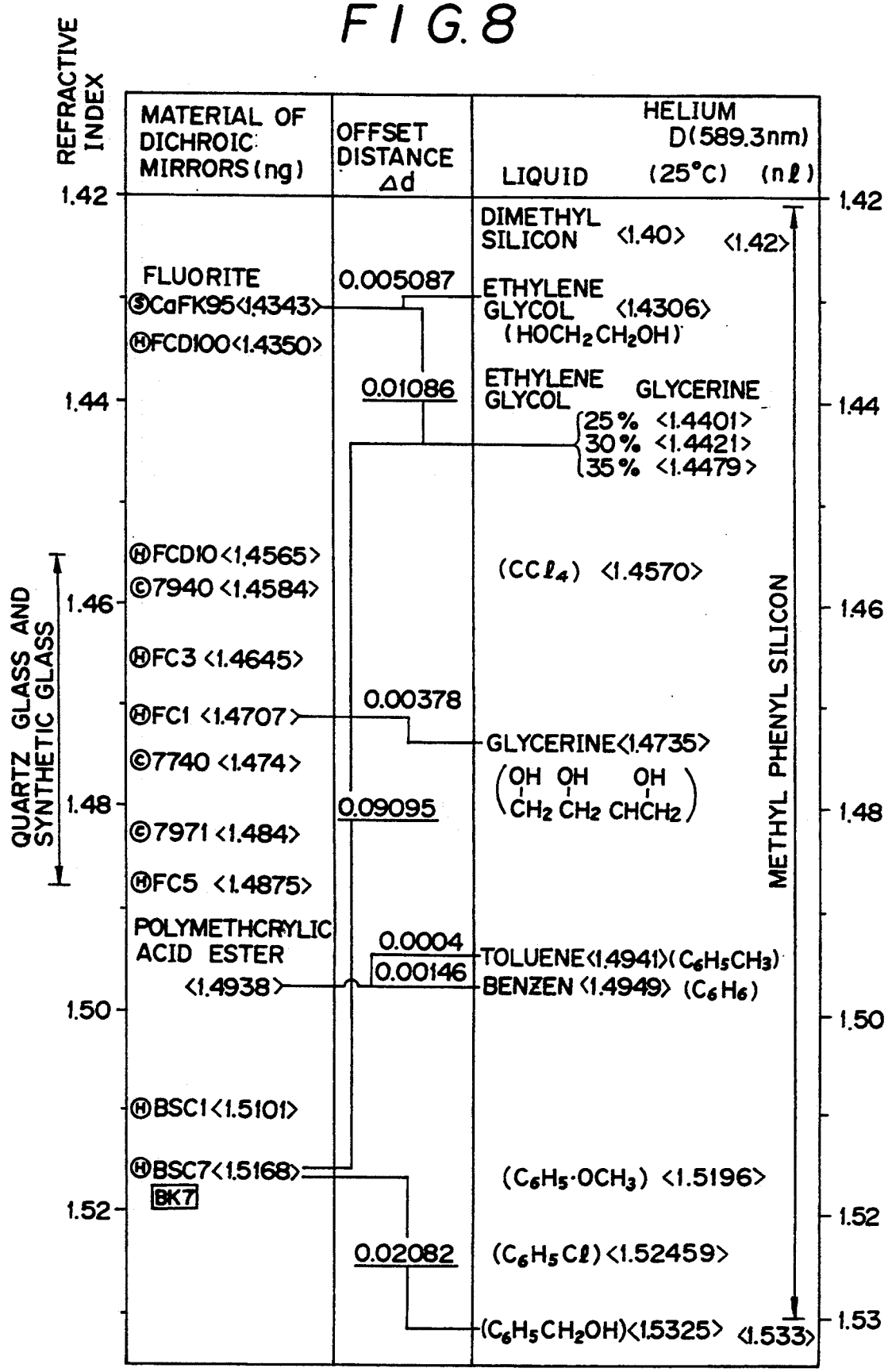
FIG. 8 is a view showing an example of combinations between material of the dichroic mirrors and liquid according to the embodiment of the invention.

FIG. 8 shows an example of combinations between the material of the dichroic mirrors and the liquid. In the figure, reference characters S, H and C respectively represent products made by Sumida Optics Co., Ltd., Hoya Corporation and Corning Glass Inc.. The numerals next to the characters represent the glass materials of each company.

In FIG. 8, the combination of the liquid material and the dichroic mirror material, connected by the line directed right-downward from the dichroic mirror material (on the left hand side of the figure) to the liquid material (on the right hand side of the figure), is desirable according to the present invention. For example, with respect to the fluorite CaFK95 ($n_g$=1.4343), the ethylene glycol+glycerins ($n_L$=1.4401 for the glycerine amount 25%, $n_L$=1.4421 for the glycerine amount 30%, and $n_L$1.4479 for the glycerine amount 35%) to cause the offset amount Δd of 0.01086, is desirable. With respect to the BSC 7 ($n_g$=1.5168), the benzyl alcohol ($n_L$=1.5325) is preferable to cause the offset amount Δd of 0.02082. On the contrary, the ethylene glycol+glycerine with respect to the BSC 7($n_g$=1. 5168) to cause the offset amooount Δd of 0.09095, does not meet the condition of the present invention, which leads to the evil result that the offset amount is further increased as the temperature of the liquid material is increased.

Figure 9:
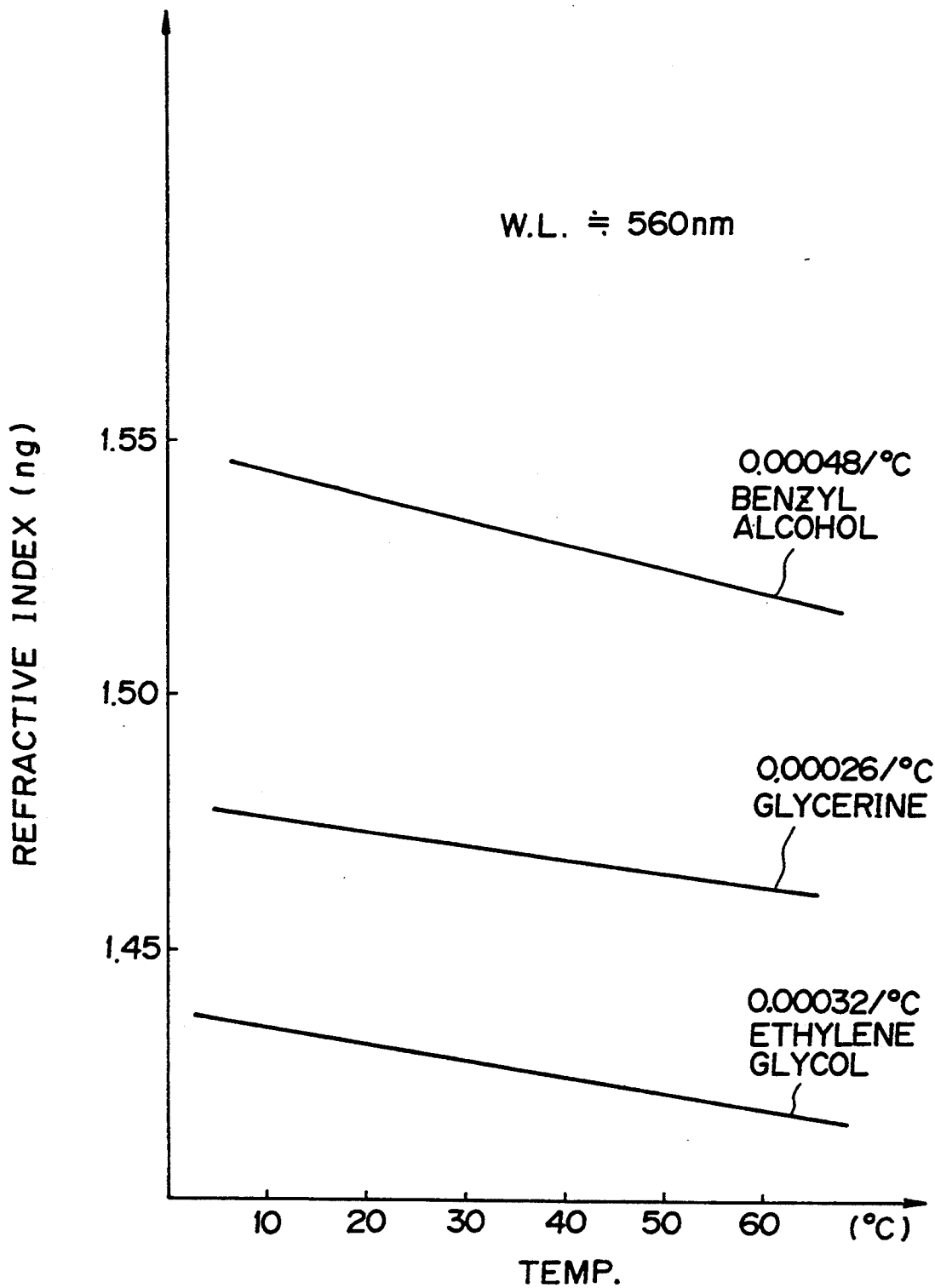
FIG. 9 is a graph showing a temperature characteristic of the liquid according to the embodiment of the invention.

FIG. 9 shows a temperature characteristic of the liquid. From this, it is apparent that the refractive index $n_1$ is gradually decreased when the temperature is elevated (temperature dependency).

If the refractive index $n_g$ of the glass of the dichroic mirrors 72 to 75 would be the same as the refractive index $n_1$ of the liquid 84, there would be no adverse affect on the quality of the central portion of the image. However, it is impossible to obtain the products which meet this condition.

However, according to the present embodiment, as understood from FIG. 9, the out-of focus image in the vicinity of the center line on the screen, can be prevented, which is the object of the present invention, by use of the liquid material, which refractive index is made approximately same as the refractive index of the glass material, which refractive index is not substantially changed by the temperature, by employing a device to keep constant the temperature of the liquid material.

Accordingly, in the preferred embodiment of the invention, the liquid which has a higher refractive index than that of the glass is used, and the liquid is heated to reduce the refractive index so as to approach that of the glass.

For instance, the light collecting reflector 51 having a light source as shown in FIG. 3 is located close to the three color separation/synthesis mirror device 58. Then, heat-radiation effect from the light collecting reflector 51 causes the temperature of the liquid to be increased to that the temperature of the liquid (for example, benzyl alcohol) filled in the mirror device 58 is elevated from 25° C. ($n_1$=1.5325) to 60° C. ($n_1$=1.5170). Correspondingly, the refractive index there $n_1$ is decreased. In this case, if the refractive index $n_1$ (=1.5168) of the glass is used for the dichroic mirrors 72 and 75 and the correction prism 86 is used, the refractive index $n_1$ will be close to the refractive index $n_g$ of the glass. Thus, the offset distance Δd becomes very small to thereby suppress the image blur along the joint portion of the mirrors to provide a clear image on the screen.

Thus, according to the present invention, it is possible to reduce the stray light, difference in refractive index and out-of-focus image to thereby improve the contrast of the image.

Figure 13:
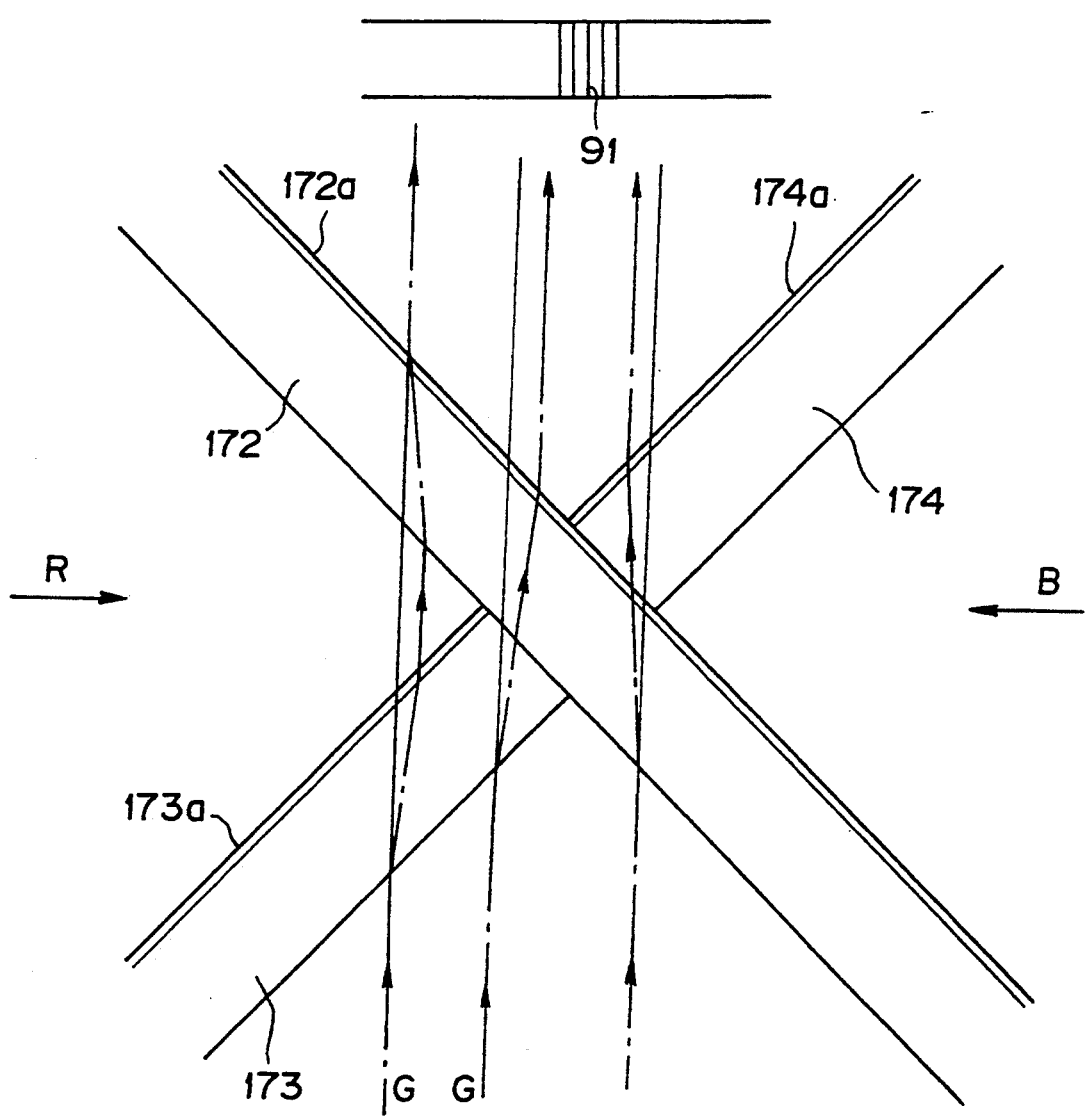
FIG. 13 is an enlarged plan view showing a joint portion of the dichroic mirror of another embodiment according to the invention.
Figure 14:
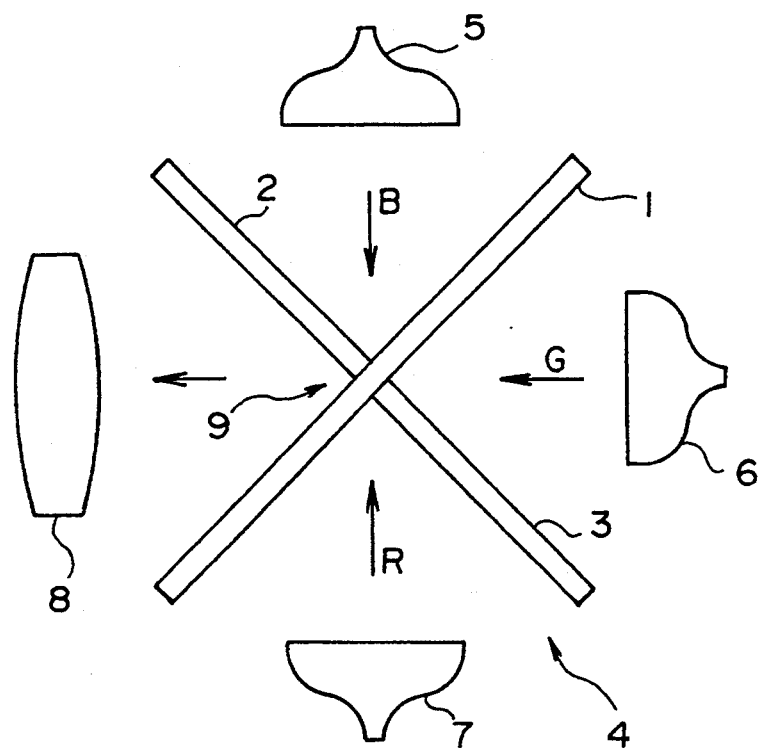
FIG. 14 is a view showing a structure of a cross-type three-color separation/synthesis mirror device.

FIG. 13 shows another embodiment of the present invention. In the above explained embodiments, the three color separation/synthesis mirror device includes four dichroic mirrors. However, the embodiment of FIG. 13 includes only three dichroic mirrors.

In FIG. 13, the three color separation/synthesis mirror device includes a dichroic mirror 172 which plays functions of two dichroic mirrors of the aforementioned embodiments. The mirror device also includes dichroic mirrors 173 and 174, which are attached to the dichroic mirror 172 at a central portion thereof. A dichroic mirror surface 172a of the dichroic mirror 172 extends through the center of the mirror device, while the edges of dichroic mirror surfaces 173a and 174a of the dichroic mirrors 173 and 174 are situated at the center of the mirror device. By constituting in this manner, the same effect and advantageous of the aforementioned embodiments can be achieved by use of only three of dichroic mirrors, which is the additional advantage of this embodiment.

The three color separation/synthesis mirror device according to the present invention may be applied to various projectors such as liquid crystal projectors and CRT projectors. Also, it is possible to apply the invention to cameras for separating the light into three colors. In this case, the relationship between the incidental light and the emergent light is reversed to obtain the same effect. Also, the three principal color input/output may be a single color input/output.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A three color/separation synthesis mirror device comprising:
   a housing;
   four dichroic mirrors which are arranged in the housing and cross with each other at right angles to form an X-shape;
   a liquid filled in the housing so as to submerge the respective dichroic mirrors, wherein a refractive index of the liquid is higher than that of the dichroic mirrors; and means for heating said liquid so as to cause the refractive index of the liquid to approach that of the dichroic mirrors.

2. A three color separation/synthesis mirror device comprising:
a housing;
four dichroic mirrors which are arranged in the housing and cross with each other at right angles to form an X-shape;
a liquid filled in the housing so as to submerge the respective dichroic mirrors; and
a correction prism located in a corner on the incidental side of the X-shaped dichroic mirrors for making an emergent light in parallel to an incident light,
wherein a refractive index of the liquid is higher than that of the dichroic mirrors.

3. A device according to claim 2, wherein said correction prism is in the form of a rectangular post having a regular square cross-section.

4. A device according to claim 2, wherein said liquid comprises one selected from the group consisting of benzyl alcohol, toluene, benzene and a mixture of ethylene glycol and glycerine.

5. A device according to claim 1, wherein said heating means comprises a light collecting reflector for heating said liquid by heat-radiation effect.

6. A device according to claim 1, wherein said heating means is adapted to keep constant the temperature of the liquid in accordance with the refractive index of the dichroic mirrors with respect to a wavelength of a green light.

7. A projection display apparatus comprising:
a light source for generating a light containing three primary color lights;
a component color separator for separating the light from the light source into the three primary color lights;
three light valves in which optical images are formed for respectively modulating the three primary color lights from the component color separator;
drivers for driving the three light valves according to a video signal to form the optical images;
a light combiner for combining modulating lights from the three light valves into a composite luminous flux; and
a project lens for projecting the composite luminous flux onto a screen to produce thereon an enlargement of the optical images,
wherein said light combiner comprises:
a housing;
four dichroic mirrors which are arranged in the housing and cross with each other at right angles to form an X-shape; and
a liquid filled in the housing so as to submerge the respective dichroic mirrors,
wherein a refractive index of the liquid is higher than that of the dichroic mirrors,
said light combiner further comprising means for heating said liquid so as to cause the refractive index of the liquid of approach the refractive index of the dichroic mirrors.

8. A projection display apparatus comprising:
a light source for generating a light containing three primary color lights;
a component color separator for separating the light from the light source into the three primary color lights;
three light valves in which optical images are formed for respectively modulating the three primary color lights from the component color separator;
drivers for driving the three light valves according to a video signal to form the optical images;
a light combiner for combining modulated lights from the three light valves into a composite luminous flux; and
a project lens for projecting the composite luminous flux into a screen to produce thereon an enlargement of the optical images,
wherein said light combiner comprises:
a housing;
four dichroic mirrors which are arranged in the housing and cross with each other at right angles to form an X-shape;
a liquid filled in the housing so as to submerge the respective dichroic mirrors; and
a correction prism located in a corner on the incidental side of the X-shaped dichroic mirrors for making an emergent light in parallel to an incidental light,
wherein a refractive index of the liquid is higher than that of the dichroic mirrors.

9. An apparatus according to claim 8, wherein said correction prism is in the form of a rectangular post having a regular square cross-section.

10. An apparatus according to claim 8, wherein said liquid comprises one selected from the group consisting of benzyl alcohol, toluene, benzene and a mixture of ethylene glycol and glycerine.

11. An apparatus according to claim 7, wherein said heating means comprises a light collecting reflector for heating said liquid by heat-radiation effect.

12. An apparatus according to claim 7, wherein said heating means is adapted to keep constant the temperature of the liquid in accordance with the refractive index of the dichroic mirrors with respect to a wavelength of a green light.

13. A three color separation/synthesis mirror device comprising:
a housing;
at least three dichroic mirrors which are arranged in the housing and cross with each other at right angles to form an X-shape; and
a liquid filled in the housing so as to submerge the respective dichroic mirrors,
wherein a refractive index of the liquid is higher than that of the dichroic mirrors,
said device further comprising means for heating said liquid so as to cause the refractive index of the liquid to approach the refractive index of the dichroic mirrors.

14. A three color separation/synthesis mirror device comprising:
a housing;
at least three dichroic mirrors which are arranged in the housing and cross with each other at right angles to form an X-shape;
a liquid filled in the housing so as to submerge the respective dichroic mirrors; and
a correction prism located in a corner on the incidental side of the X-shaped dichroic mirrors for making an emergent light in parallel to an incidental light, wherein a refractive index of the liquid is higher than that of the dichroic mirrors.

15. A device according to claim 14, wherein said correction prism is in the form of a rectangular post having a regular square cross-section.

16. A device according to claim 3, wherein each side of said regular square cross-section has a length equal to a thickness of said dichroic mirror.

17. An apparatus according to claim 9, wherein each side of said regular square cross-section has a length equal to a thickness of said dichroic mirror.

18. A device according to claim 15, wherein each side of said regular square cross-section has a length equal to a thickness of said dichroic mirror.

* * * * *